United States Patent
Sasaki et al.

(10) Patent No.: US 10,220,904 B2
(45) Date of Patent: Mar. 5, 2019

(54) HAND GRIP AND INNER HOUSING OF HAND GRIP

(71) Applicant: FALTEC CO., LTD., Kanagawa (JP)

(72) Inventors: Kouzo Sasaki, Kanagawa (JP); Yuichi Fukuda, Kanagawa (JP); Shigeki Koyanagi, Kanagawa (JP); Kaoru Saito, Kanagawa (JP)

(73) Assignee: FALTEC CO., LTD., Kanagawa (JP)

( * ) Notice: Subject to any disclaimer, the term of this patent is extended or adjusted under 35 U.S.C. 154(b) by 264 days.

(21) Appl. No.: 15/117,229

(22) PCT Filed: Mar. 28, 2016

(86) PCT No.: PCT/JP2016/001803
§ 371 (c)(1),
(2) Date: Aug. 8, 2016

(87) PCT Pub. No.: WO2016/157888
PCT Pub. Date: Oct. 6, 2016

(65) Prior Publication Data
US 2018/0194420 A1    Jul. 12, 2018

(30) Foreign Application Priority Data

Mar. 27, 2015   (JP) .................................. 2015-066383

(51) Int. Cl.
*B62J 33/00* (2006.01)
*B62J 99/00* (2009.01)
(Continued)

(52) U.S. Cl.
CPC ............... *B62J 33/00* (2013.01); *B62J 99/00* (2013.01); *B62K 21/26* (2013.01); *B62K 23/04* (2013.01);
(Continued)

(58) Field of Classification Search
CPC ...... B62J 33/00; B62J 99/00; B62J 2099/002; B62J 2099/004; H05B 3/54; B62K 21/26; B62K 23/04
See application file for complete search history.

(56) References Cited

U.S. PATENT DOCUMENTS

| | | | |
|---|---|---|---|
| 7,829,821 B2 | 11/2010 | Yamada et al. | |
| 2004/0007567 A1* | 1/2004 | Downey | B62J 33/00 |
| | | | 219/494 |

(Continued)

FOREIGN PATENT DOCUMENTS

| | | |
|---|---|---|
| JP | 2006-306318 A | 11/2006 |
| JP | 2007-050714 A | 3/2007 |

(Continued)

OTHER PUBLICATIONS

International Search Report for corresponding International Application No. PCT/JP2016/001803, dated Jun. 14, 2016.

(Continued)

*Primary Examiner* — Shawntina Fuqua
(74) *Attorney, Agent, or Firm* — Renner, Otto, Boisselle & Sklar, LLP

(57) ABSTRACT

To avoid causing significant damage to a temperature sensor or an unintentional shift of the temperature sensor, a hand grip disclosed herein includes: a cylindrical inner housing 110; a heating element 120 provided adjacent to an outer peripheral side of the inner housing 110; a temperature sensor 140 provided adjacent to the outer peripheral side of the inner housing 110; and a sheathing 130 covering the inner housing 110, the heating element 120, and the temperature sensor 140. A recess 111 is formed on an outer peripheral surface of the inner housing 110, and the temperature sensor 140 is fitted into the recess 111.

7 Claims, 4 Drawing Sheets

(51) Int. Cl.
*B62K 23/04* (2006.01)
*B62K 21/26* (2006.01)
*H05B 3/54* (2006.01)

(52) U.S. Cl.
CPC .......... *H05B 3/54* (2013.01); *B62J 2099/002* (2013.01); *B62J 2099/004* (2013.01)

(56) References Cited

U.S. PATENT DOCUMENTS

| | | |
|---|---|---|
| 2006/0248683 A1 | 11/2006 | Ohishi et al. |
| 2009/0065491 A1 | 3/2009 | Fitzgerald et al. |
| 2009/0194518 A1 | 8/2009 | Fujiwara et al. |

FOREIGN PATENT DOCUMENTS

| | | | |
|---|---|---|---|
| JP | 2007-98966 A | | 4/2007 |
| JP | 2008-195312 | * | 8/2008 |
| JP | 2008-195312 A | | 8/2008 |
| JP | 2010-537894 A | | 12/2010 |

OTHER PUBLICATIONS

Form PCT/ISA/237 for corresponding International Application No. PCT/JP2016/001803, dated Jun. 14, 2016.
Notification of Reasons for Refusal dated Apr. 21, 2016, along with English translation for Japanese Application No. 2015-066383.
Decision to Grant a Patent dated Feb. 23, 2016, along with English translation for Japanese Application No. 2015-066383.

* cited by examiner

HAND GRIP AND INNER HOUSING OF HAND GRIP

TECHNICAL FIELD

The present invention relates to hand grips provided for motorcycles, snow mobiles, and other vehicles.

BACKGROUND ART

Some hand grips gripped by riders of, e.g., motorcycles have a built-in heater for warming up his or her gripping hands. Among such hand grips, some known ones are provided with a temperature sensor for controlling the quantity of heat generated by the heater. Specifically, in a known hand grip, a thermistor is bonded, with an adhesive of epoxy resin, to the surface of a flexible circuit provided with a heating resistive wire and wound around a grip sleeve (see, e.g., Patent Document 1). Such a flexible circuit and thermistor are covered with, e.g., a synthetic rubber molded part.

CITATION LIST

Patent Document

PATENT DOCUMENT 1: Japanese Unexamined Patent Publication (Translation of PCT Application) No. 2010-537894

SUMMARY OF THE INVENTION

Technical Problem

The thermistor bonded to the surface of the flexible circuit as described above receives, when subjected to a molding process with synthetic rubber, a fluid pressure of the synthetic rubber flowing. Thus, this may disadvantageously cause damage to the thermistor. This may also disadvantageously shift the thermistor from its proper position, resulting in an increase in variation in the detected temperature.

In view of the foregoing background, it is therefore an object of the present invention to provide a technique for easily avoiding causing significant damage to a temperature sensor or causing an unintentional shift of the temperature sensor.

Solution to the Problem

A first aspect of the present invention provides a hand grip including: a cylindrical inner housing; a heating element provided adjacent to an outer peripheral side of the inner housing; a temperature sensor provided adjacent to the outer peripheral side of the inner housing; and a sheathing covering the inner housing, the heating element, and the temperature sensor. A recess is formed on an outer peripheral surface of the inner housing, and the temperature sensor is fitted into the recess.

As can be seen, the temperature sensor is fitted into the recess of the inner housing. This may reduce an influence caused by a fluid pressure when the sheathing is formed by a molding process so much as to easily avoid causing damage to the temperature sensor.

Advantages of the Invention

According to the present invention, damage to be done on a temperature sensor or an unintentional shift of the temperature sensor may be avoided easily.

DESCRIPTION OF EMBODIMENTS

An embodiment of the present invention will now be described in detail with reference to the drawings.

Figure 1:
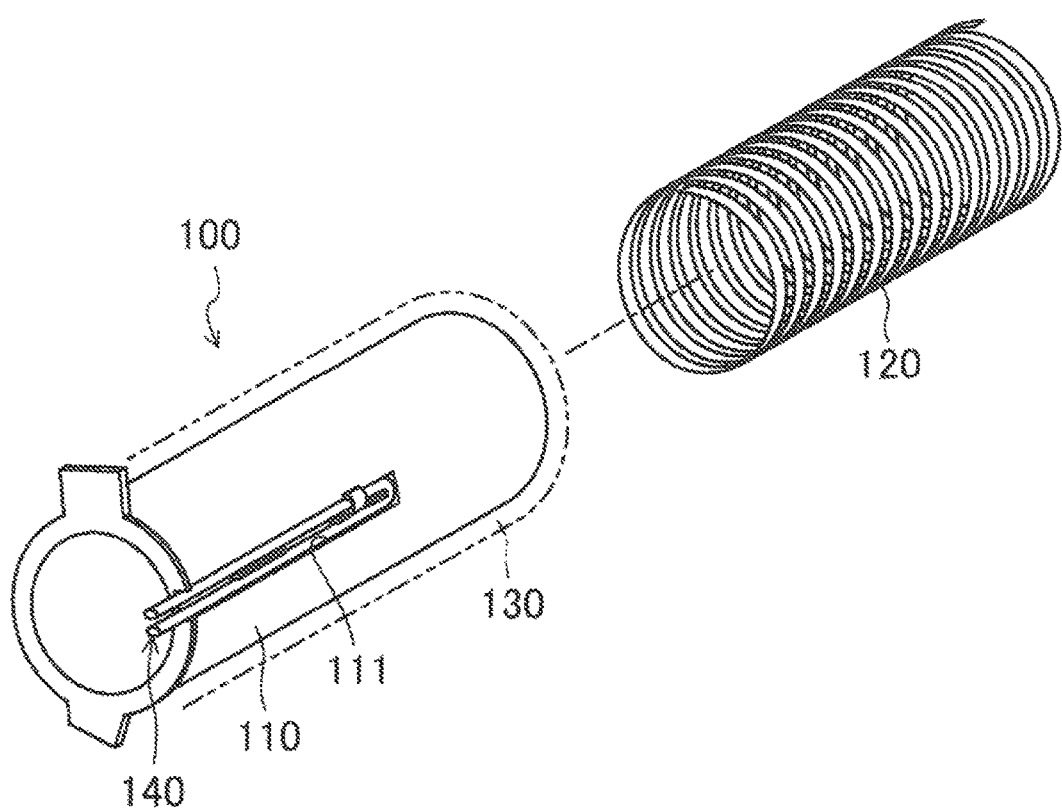
FIG. 1 is a perspective view illustrating a configuration of a main portion of a hand grip 100 according to an embodiment.

As illustrated in FIG. 1, a hand grip 100 is formed by winding a spiral heating element 120 around the outer periphery of a cylindrical inner housing 110 (grip core), and further subjecting the resultant to a molding process with a sheathing 130 of, e.g., synthetic rubber. The inner housing 110 is made of, e.g., flexible rubber or resin. The heating element 120 is configured as metal foil, such as stainless foil or copper foil in the shape of a strip with a narrow width so as to have a predetermined resistance value.

Figure 2:
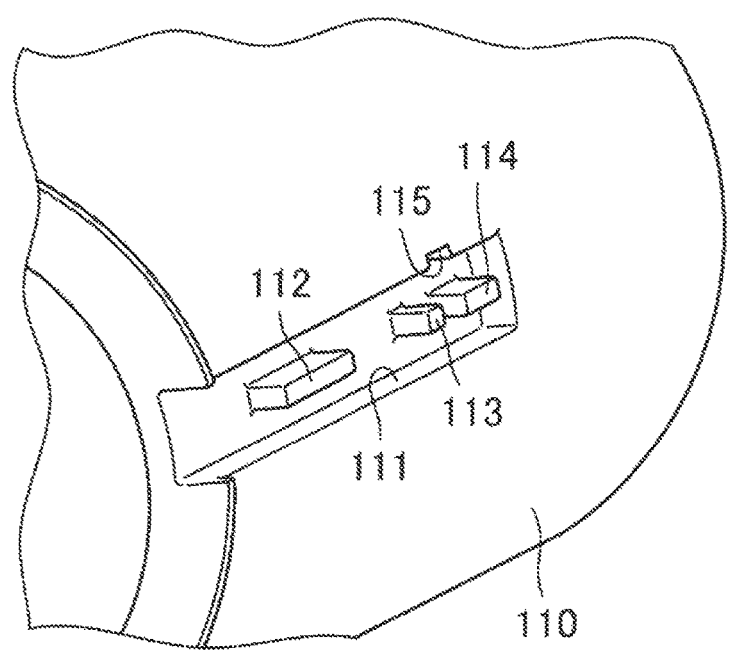
FIG. 2 is a perspective view illustrating in detail, on an enlarged scale, a main portion of an inner housing 110 according to an embodiment.

The inner housing 110 is provided with a groove recess 111 extending in the longitudinal direction of the inner housing 110. As illustrated in FIG. 2, inside of the recess 111, provided are projections 112-114 at appropriate intervals in the longitudinal direction of the inner housing 110. Also, a side wall of the recess 111 is partially recessed to form a broad width portion 115. The projections 112-114 may be provided continuously. In general, however, arranging them at appropriate intervals makes it easier to fit lead wires 141 and 142 of a temperature sensor 140.

Figure 3:
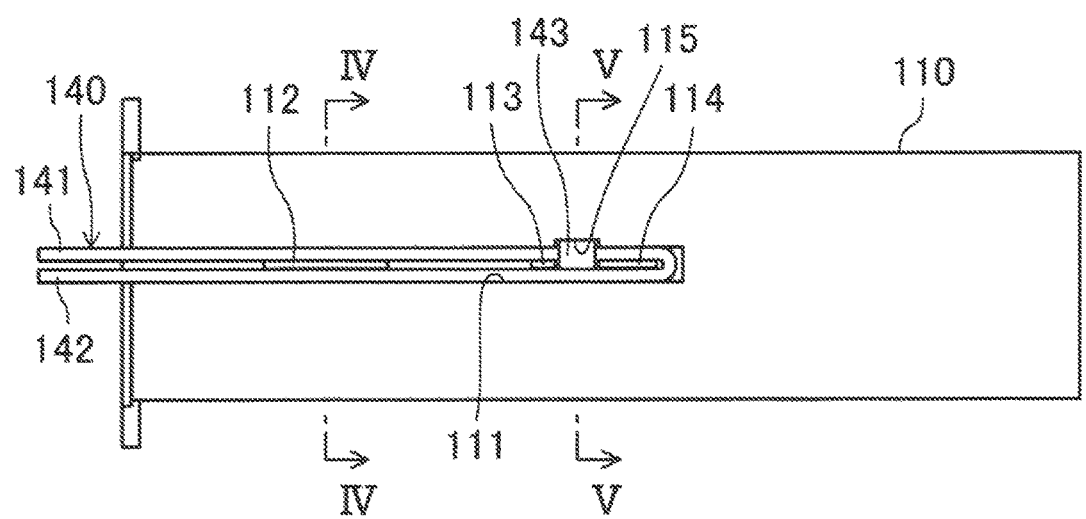
FIG. 3 is a front view illustrating how a temperature sensor 140 according to an embodiment is attached.
Figure 4:
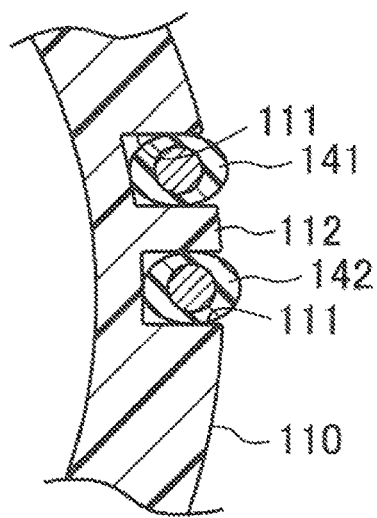
FIG. 4 is a cross-sectional view of FIG. 3 according to the embodiment as taken along the plane IV-IV.
Figure 5:
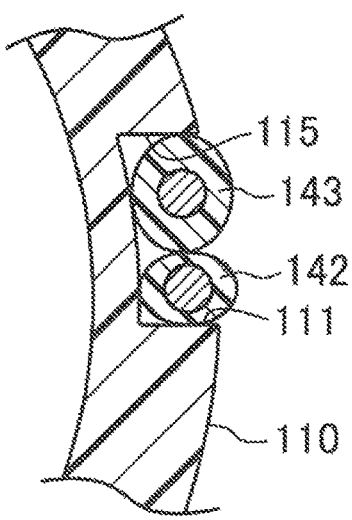
FIG. 5 is a cross-sectional view of FIG. 3 according to the embodiment as taken along the plane V-V.

The temperature sensor 140 is fitted into the recess 111. The temperature sensor 140 is formed by connecting the lead wires 141 and 142 to a detection element 143 such as a thermistor, as illustrated in, e.g., FIG. 3. Each of the lead wires 141 and 142 is fitted into the space between the inner wall of the recess 111 and the projections 112-114, as illustrated in FIG. 4. Also, the detection element 143 is attached so as to be fitted into the broad width portion 115 of the recess 111, as illustrated in FIG. 5 (note that, in FIG. 5, the cross-section of the detection element 143 is simplified for convenience sake). More specifically, the position of the detection element 143 in the circumferential direction of the hand grip 100 is determined by the wall surface of the broad width portion 115 of the recess 111, and the position of the detection element 143 in the longitudinal direction of the inner housing 110 is determined by arrangement of the detection element 143 between the projections 113 and 114 of the recess 111. It is not always necessary to press-fit at least one of the lead wires 141 and 142 and the detection element 143 into the recess 111, but they may be inserted into the recess with some gap left. It is recommended to press-fit them in order to facilitate holding the detection element 143 firmly.

The position of the detection element 143 of the temperature sensor 140 in the circumferential or longitudinal direction of the hand grip 100 is not particularly limited. The temperature sensor 140 may be disposed at any position as long as it is suitable for heating control of the heating element 120. For example, the position of the recess 111 in the circumferential direction of the hand grip 100 may be set, if the hand grip 100 is attached to a handle of a vehicle such as a motorcycle, at the front side (i.e., in a vehicle traveling direction). This facilitates detecting the temperature of a portion to be easily affected by wind during traveling. The position of the temperature sensor 140 in the longitudinal direction of the hand grip 100 may be set around the intermediate portion in the longitudinal direction. This facilitates detecting a mean temperature in the longitudinal direction. The position of the temperature sensor 140 in the longitudinal direction of the hand grip 100 may be set to be located at a predetermined distance from the end of the hand grip 100. This may reduce a possibility of breakdown in the event of vehicle rollover. The positional relation between the detection element 143 and the heating element 120 may be varied according to the positions of the recess 111 and the broad width portion 115. For example, the detection element 143 and the heating element 120 may be disposed to overlap with each other to easily detect the degree of heating of the heating element 120 directly. Alternatively, the detection element 143 and the heating element 120 may be disposed not to overlap with each other to easily detect, e.g., the temperature of the sheathing 130.

As can be seen, the temperature sensor 140 is fitted into the recess 111 of the inner housing 110. This may reduce an influence caused by a fluid pressure when the sheathing 130 is formed by molding so much as to easily avoid causing significant damage to the temperature sensor 140. In addition, this may also facilitate avoiding an unintentional shift of the temperature sensor 140. As a result, this may easily improve the accuracy of the detected temperature of the hand grip 100. Furthermore, even if some pressing force is applied externally to the sheathing 130, the force applied to the temperature sensor 140 tends to be reduced as long as the temperature sensor 140 is fitted into the recess 111 of the inner housing 110. This facilitates avoiding shortening the lifetime of the temperature sensor 140. Besides, the temperature sensor 140 may easily be positioned even if it is not fixed to the inner housing 110 with, e.g., an adhesive tape. This facilitates simplifying its manufacturing process.

If the lead wires 141 and 142 and the detection element 143 are fully embedded in the recess 111 in its depth direction, the influence caused by the fluid pressure during the molding process of the sheathing 130 may be reduced more easily. However, the lead wires 141 and 142 and the detection element 143 may be only partially embedded as long as the influence caused by the fluid pressure is reducible sufficiently.

It is recommended that the whole temperature sensor 140, including the lead wires 141 and 142 and the detection element 143, be fitted into the recess 111 in order to more reliably avoid causing significant damage to the temperature sensor 140 or an unintentional shift of the temperature sensor 140. However, the present invention is not limited thereto. Alternatively, only a part of the temperature sensor 140, e.g., only the detection element 143 may be embedded as well. The shape of the recess 111 is not limited to the groove one, but just needs to correspond to that of a portion of the temperature sensor 140 fitted into the recess 111.

The outer peripheral surface of the inner housing 110 may be provided with a groove for positioning the heating element 120 as needed. Also, the inner housing 110 may have a through hole, through which a part of the sheathing 130 enters the inside of the inner housing 110 during its molding process, in order to improve the fixing strength of the sheathing 130 to the inner housing 110.

(Variations)

Figure 6:
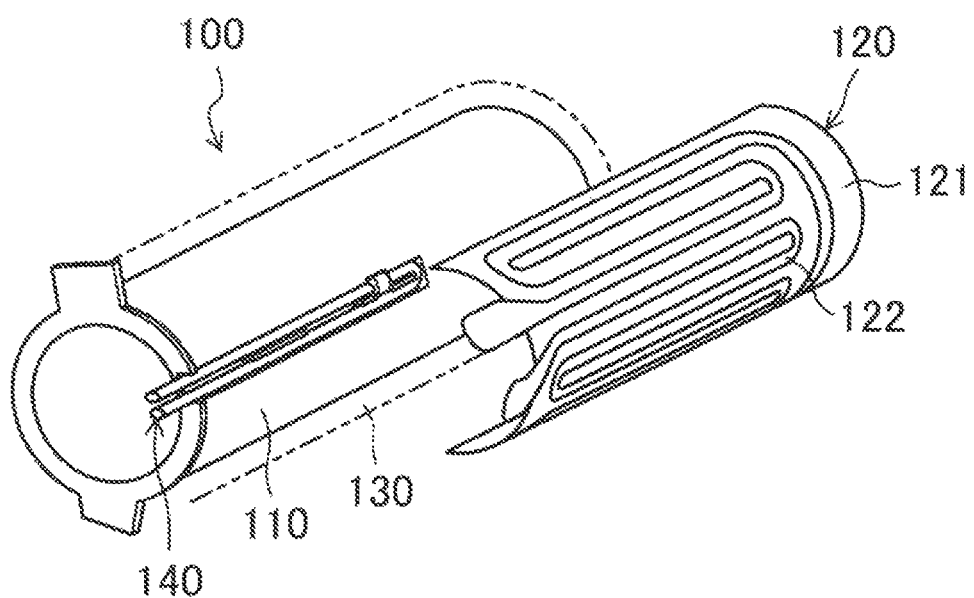
FIG. 6 is a perspective view illustrating a configuration of a main portion of a hand grip 100 according to a variation.
Figure 7:
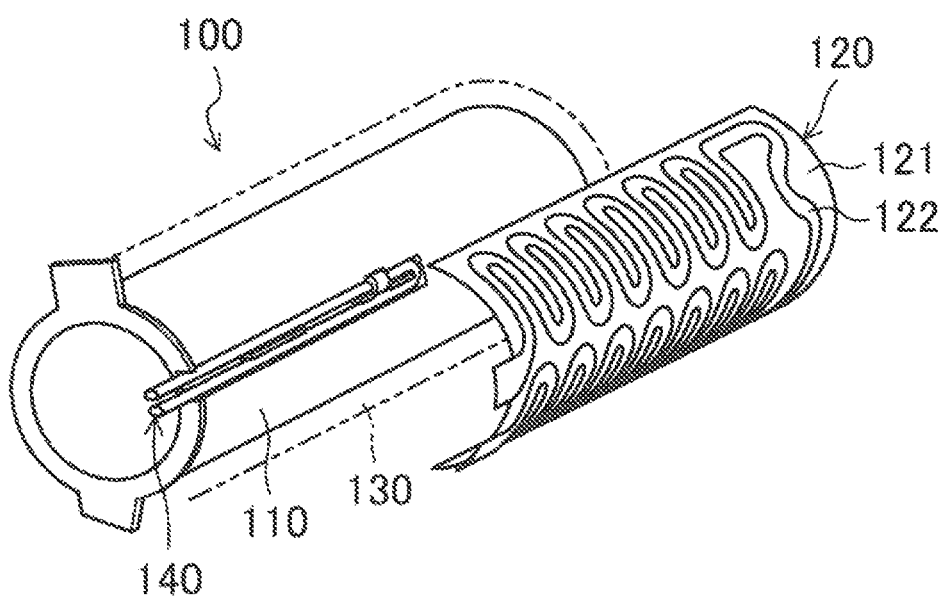
FIG. 7 is a perspective view illustrating a configuration of a main portion of a hand grip 100 according to another variation.

The heating element 120 is not limited to the strip-shaped, spirally-wound metal foil as described above. Alternatively, heating elements of various other shapes may also be used. For example, an insulating film, made of flexible resin, on which a heating element is formed as a pattern may also be used. More significantly, a resin film 121 may be provided with a heating element pattern 122 in which a strip made of, e.g., stainless foil or copper foil and extending in the longitudinal direction of the hand grip 100 is folded back, as illustrated in, e.g., FIG. 6, or another heating element pattern 122 in which a strip extending in the circumferential direction of the hand grip 100 is folded back, as illustrated in FIG. 7.

If the heating element 120 obtained by forming a heating element pattern on an insulating film is used as described above, the strip width and density of the heating element pattern 122 may be varied to facilitate adjusting arbitrarily the distribution of quantities of heat generated. If the spiral heating element 120 formed into a strip with a narrow width is used as described above, the distribution of quantities of heat generated may also be arbitrarily adjusted easily by narrowing the width of the strip or providing a cutout, hole, or slit. For example, a heat spot where a larger quantity of heat is generated per unit area may be disposed at the frontend of the hand grip 100 to reduce the magnitude of a temperature fall due to exposure to wind during traveling. Alternatively, the detection element 143 of the temperature sensor 140 may be disposed at such a heat spot.

DESCRIPTION OF REFERENCE CHARACTERS

100 Hand grip
110 Inner Housing
111 Recess
112 Projection
112-114 Projection
115 Broad Width Portion
120 Heating Element
121 Resin Film
122 Heating Element Pattern
130 Sheathing
140 Temperature Sensor
141, 142 Lead Wire
143 Detection Element

The invention claimed is:

1. A hand grip comprising:
a cylindrical inner housing;
a heating element provided adjacent to an outer peripheral side of the inner housing;
a temperature sensor provided adjacent to the outer peripheral side of the inner housing; and
a sheathing covering the inner housing, the heating element, and the temperature sensor, wherein
a recess having at least one closed end in a longitudinal direction of the inner housing is formed on an outer peripheral surface of the inner housing, and
the temperature sensor is fitted into the recess.

2. The hand grip of claim 1, wherein
at least one of a detection element of the temperature sensor or a lead wire connected to the detection element is press-fitted into the recess of the inner housing.
3. The hand grip of claim 1, wherein
the heating element is provided outside of the temperature sensor fitted into the recess of the inner housing with respect to the outer peripheral surface of the inner housing.
4. The hand grip of claim 1, wherein
the heating element is formed by
spirally winding a strip heating element around the inner housing or
disposing a patterned sheet heating element on an insulating film, and winding the sheet heating element with the insulating film around the inner housing.
5. The hand grip of claim 1, wherein
in the heating element, a quantity of heat generated per unit area varies from one position on the hand grip to another, and the temperature sensor is disposed at a position at which a larger quantity of heat is generated than at least at another position.
6. The hand grip of claim 5, wherein
the position at which the larger quantity of heat is generated by the heating element is located at a front side of a vehicle in its traveling direction, the hand grip being attached to the vehicle.
7. An inner housing for use in the hand grip of claim 1, the inner housing having the recess.

* * * * *